INVENTOR.
JEAN J. A. ROBILLARD

May 19, 1970   J. J. A. ROBILLARD   3,512,969
PHOTOGRAPHIC PROCESS BASED ON THE QUENCHING OF COLOR CENTERS
Filed Sept. 22, 1964   4 Sheets-Sheet 2

INVENTOR.
JEAN J. A. ROBILLARD
BY Darby & Darby
ATTORNEYS

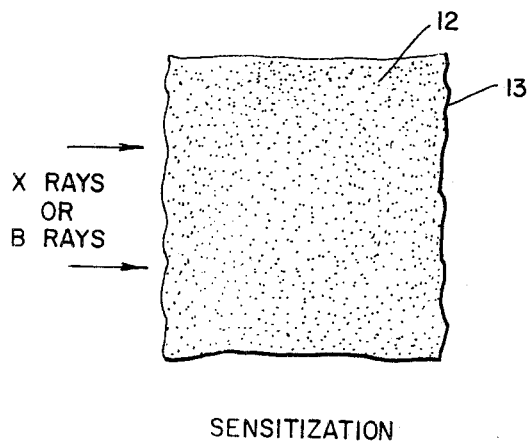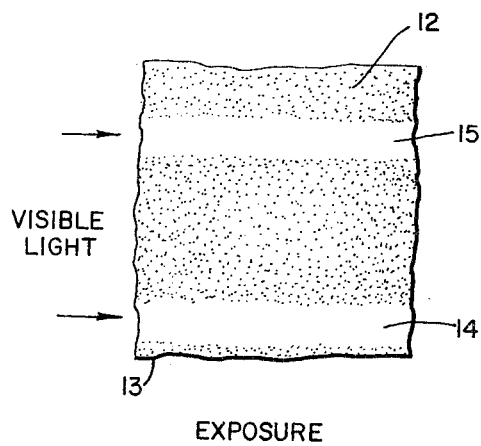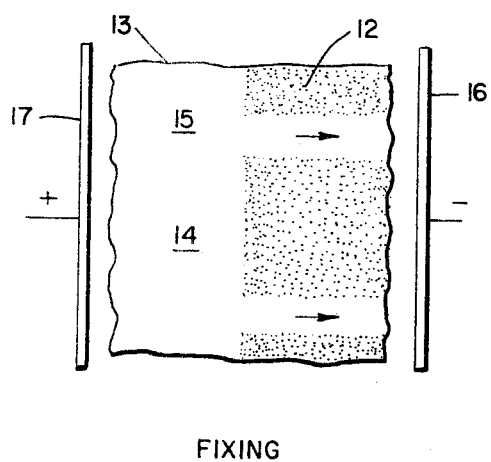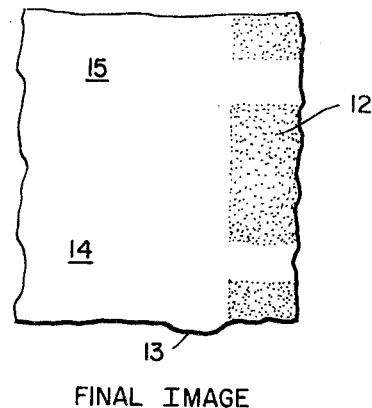

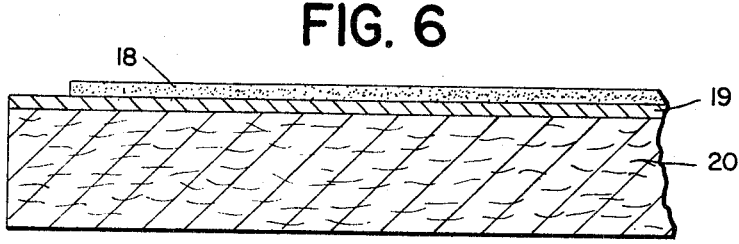
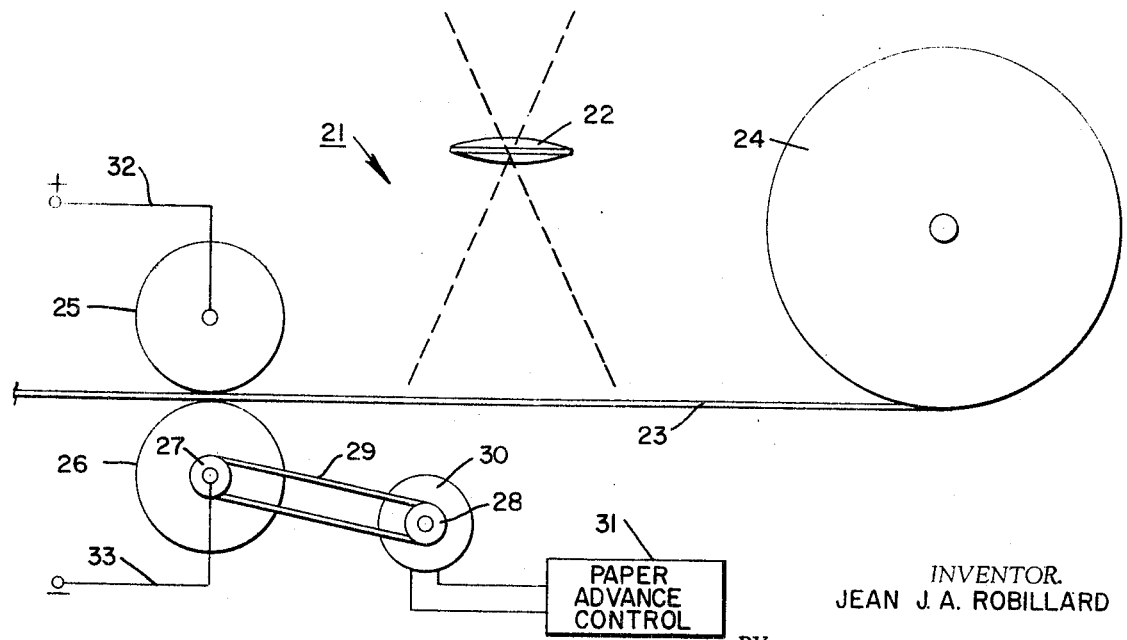

United States Patent Office 3,512,969
Patented May 19, 1970

3,512,969
PHOTOGRAPHIC PROCESS BASED ON THE QUENCHING OF COLOR CENTERS
Jean J. A. Robillard, 381 Elliot St.,
Newton, Mass. 02740
Filed Sept. 22, 1964, Ser. No. 406,207
Int. Cl. G03c 5/04, 1/00
U.S. Cl. 96—27        16 Claims

ABSTRACT OF THE DISCLOSURE

A photographic process based on the selective quenching of color centers is described which comprises projecting an image on a recording medium having a surface sensitized with high energy penetrating radiation and impressing an electric field through the sensitized surface to cause the color centers formed upon the recording medium by the penetrating radiation to become stable and yield a stable image. A photo-sensitive recording medium used in the photographic process is also described.

---

The present invention relates to a photographic process based on the selective quenching of color centers. More particularly, color centers are formed in a layer of material by a previous exposure to X-rays or electron bombardment. When the sensitized material is exposed to light, a positive image is produced. The image is "fixed" by the application of an electric field which causes the color centers to migrate to stable positions.

Numerous technological areas have been explored in an attempt to develop a practical photographic or photocopy process which is both dry and rapid and is comparable with the commonly used "wet" processes. Although numerous dry processes are known in the art, they generally have one or more major disadvantages as compared to wet processes so that the latter continue to be used in spite of their many obvious disadvantages.

Examples of dry processes include thermal processes in which a chemical change is induced by heat and temperature increase, and electro-static processes in which a fine powder is selectively deposited in accordance with an image and fused or otherwise secured into position to form a permanent record. The thermal process has the disadvantage of impermanency in the presence of sustained moderately high temperatures while the electrostatic process requires the presence and distribution of at least one powdered material which creates practical inconveniences almost as great as in the case of wet processes.

According to the present invention, a dry process with good sensitivity is provided in which a substantially permanent image is formed by virtue of the application of an electric field into a recording medium according to an image projected thereon. The electro-photographic fixing process is simple to carry out, for example by passing the recording medium under a roller or another electrode. The application of the electric field to the recording medium results in a stable image which will not be bleached by light. This permits the handling of the record with its stable image in daylight.

It is another object of the present invention to provide an electro-photographic process where X-rays or electrons are projected into the recording medium for sensitization thereof.

It is still another object of the present invention to provide a photographic apparatus including means for producing an image, a recording medium including a material sensitive to the introduction of light, photosensitive material associated with the recording medium, and means for generating an electric field through the recording medium.

Another object of this invention is to provide a process which directly reproduces the image or directly copies upon exposure to the object to be reproduced and does not necessarily require chemical developing.

Another object of this invention is to employ a process which utilizes an electric field to fix an unstable image on the recording medium.

Other objects and advantages of the present invention will be apparent from a consideration of the following description in conjunction with the appended drawings in which:

FIG. 5 is a diagrammatic illustration of a single crystal of an exemplary recording material coated on a carrier or support schematically showing the step-wise development of the theory of the present invention;

FIG. 6 is a diagrammatic illustration of a photographic recording medium according to the present invention; and FIG. 7 is a schematic diagram of a photocopy apparatus according to the present invention.

To present a better understanding of the reproduction process of the present invention, the mechanism of the formation of color centers will be explained using sodium chloride as an example for the purpose of simplification. Actually, sodium chloride is less desirable than other materials because of its reaction to moisture. The explanation presented is equally applicable to other alkali halides, alkaline earth halides and other ionic compounds, especially metallic oxides.

It is known that when a crystal of an alkali halide is heated in alkali vapor, it acquires a deep coloration; yellow for sodium chloride, blue for potassium chloride, etc. The distinctive coloration that results from the heating of a crystal of sodium chloride in sodium vapor is due to the presence of a characteristic absorption band in the visible range (having a wavelength corresponding to the distinctive color) due to the absorption spectrum of an electron trapped at a vacant lattice point in the crystal.

The same result that is achieved, when a crystal of sodium chloride is heated in sodium vapor, can be achieved by the irradiation of the sodium chloride crystal with X-rays or by electron bombardment.

The mechanism in the formation of color centers, also called F centers, and their properties vary in accordance with the procedure used for producing them. In other words, color centers produced by heating a crystal of sodium chloride in sodium vapor results in color centers which have different properties than color centers which are produced through the irradiation of a crystal of sodium chloride with X-rays or Beta rays.

Figure 1:
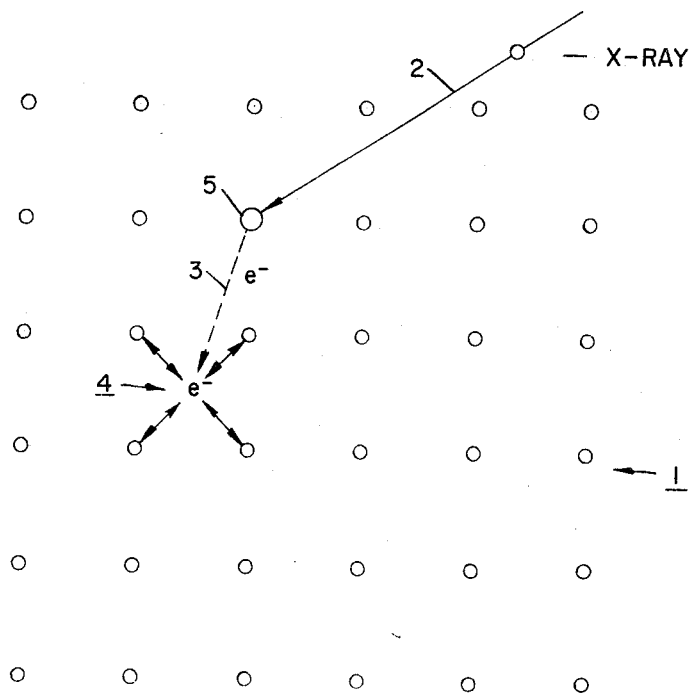
FIG. 1 is a lattice diagram of an exemplary recording material utilized in the present invention and presented to aid in the explanation of a theory of operation of the invention.

Referring now to FIG. 1, there is shown a lattice 1 of a sodium chloride crystal. The crystal is irradiated with a photon such as an X-ray 2 which strikes the lattice and ejects an electron 3 out of its position in the lattice to another position 4 at which position the electron is highly unstable. The electron is ejected into the vacancies which are present in the lattice. A chloride ion 5 is left with a positive charge at the point where the electron was ejected. Each X-ray photon so absorbed in the lattice will bring about the ejection of an electron from its position in the lattice.

The F centers, or so-called color centers, result from the electron $e^-$ being trapped in the vacant space 4 in the lattice, as shown in FIG. 1.

The color centers so formed by the irradiation with X-rays can be bleached by irradiation with a light photon 6 corresponding to the absorption band of the color center. The bleaching is due to the release of the electrons trapped in the vacancies in the lattice when a quantum of light is absorbed by the F centers. It is normal that the bleaching occurs only at the frequency corresponding to that of the color center as the quantized energy transfer necessary for the release of the electron can only take place at resonance frequency.

Figure 2:
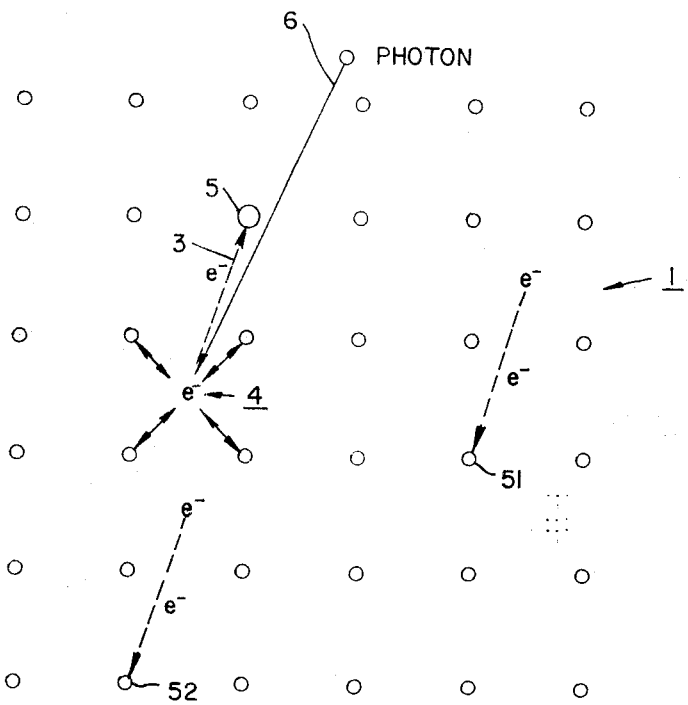
FIG. 2 is a lattice diagram of an exemplary recording material utilized in the present invention and presented to aid in the explanation of a theory of operation of the invention.

The electrons set free by the irradiation with light will normally return to one of the positive halogen ions 5 of the lattice from which an electron 3 had been ejected by the X-rays 2. A single photon of light 6 is capable of causing as many as 1000 electrons to return to a neutral halogen ion in the lattice because of vibrations set up in the lattice structure. This is illustrated in FIG. 2 where the ejected electrons are returned to positive halogen ions by the introduction of a photon of light at the frequency corresponding to that of the color center.

It will be noted that electrons are indicated to be returned to ions 51 and 52 by the effect of the impingement of the photon at lattice position 4. This is explained by the fact that the electron ejected from lattice position 4 moves from a state of high potential energy to a state of low potential energy with the excess energy being largely communicated to the crystal lattice producing vibration of the lattice. The vibrational energy of the lattice is sufficient to eject other nearby electrons from trapped lattice positions and a chain reaction involving a thousand or more such electrons may result. Obviously, the photo-sensitivity of the medium is much greater by virtue of this large number of electron displacements initiated by a single photon.

When a crystal of sodium chloride is heated in sodium vapor to produce color centers (rather than irradiated with X-rays or electrons) a metal atom absorbed at the surface of the crystal loses an electron which becomes an electron in the conduction band. At the same time, a negative ion in the crystal will move up from the layer beneath and take its place by the side of the absorbed positive metal ion, leaving a vacant lattice point which can migrate inside of the crystal and eventually trap an electron to form an F center or so-called color center.

One of the main differences between the two types of color centers, that is a color center formed by the absorption of a metal atom and formed by irradiation of the crystal with X-rays, is that those produced by irradiation with X-rays or electron bombardment can be bleached by irradiation with a light source as explained with reference to FIG. 2. Whereas, the color centers produced by the absorption of an excess metal atom remain unaffected by irradiation with a light photon and, accordingly, the color centers cannot be bleached. The atom-absorption color center is not bleached because the trapped electron is not merely locally displaced; the energy of a light photon cannot therefore release the trapped electron.

Figure 3:
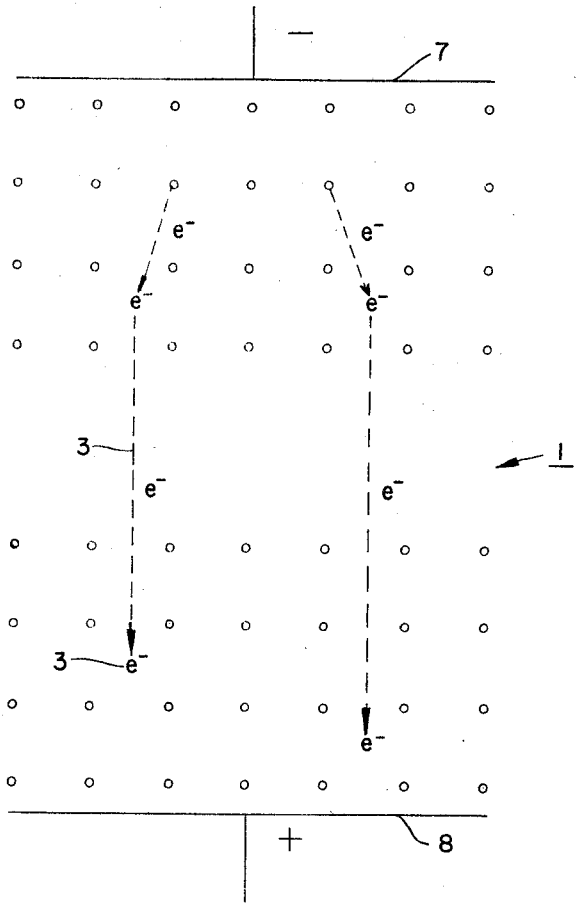
FIG. 3 is a lattice diagram of an exemplary recording material utilized in the present invention showing the application of an electric field.
Figure 4:
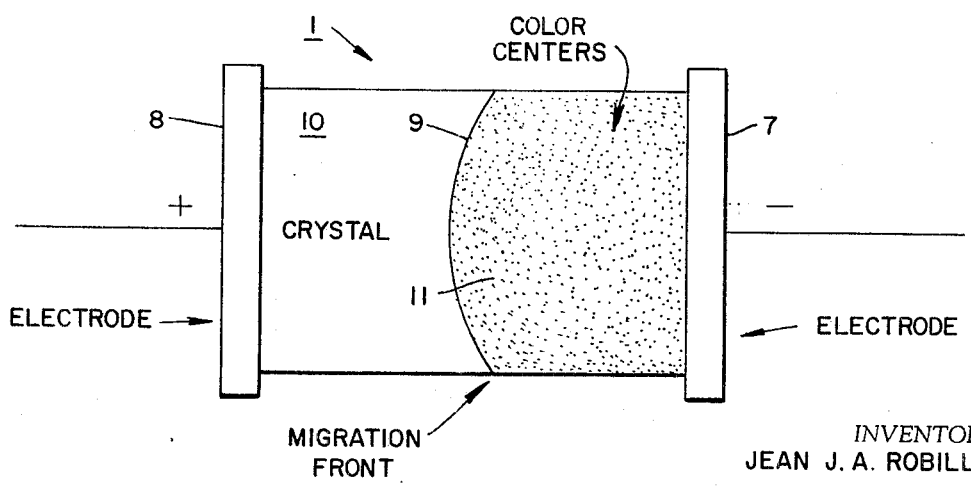
FIG. 4 is a diagrammatic illustration of the application of an electric field to a crystal of the recording material.

Color centers produced according to either one of the above-described methods have the ability to migrate under the application of an electric field. When the temperature is raised to 200°–300° centigrade the migration is rapid. This concept is illustrated in FIGS. 3 and 4. FIG. 3 shows the migration of trapped electron 3 from a cathode 7 toward an anode 8 when an electric field is applied to a crystal of sodium chloride. This phenomenon of migration can be easily observed by mounting a crystal of sodium chloride containing color centers between two electrodes 7 and 8 on which a field of a few hundred volts per centimeter is applied. Under these conditions the color is observed to migrate toward the cathode with a very sharp front 9 separating the transparent zone from the color zone. The speed of migration is of the order of 100 cm./sec./volt/cm.

FIG. 4 shows such migration of color centers toward a cathode 7 with a very sharp front 9 separating the transparent zone 10 from the color zone 11.

The importance of the phenomena of migration in respect to the present invention resides in the fact that a color center, which is produced by irradiation and hence is normally bleachable, becomes non-bleachable after undergoing a significant amount of migration under the influence of an appropriate electric field. This can be intuitively appreciated from the description of unbleachable color centers produced by absorption of metal atoms in a vapor state. The migrated radiation-induced color center has a common characteristic with the atom-absorption color center in that the trapped electron is no longer merely locally displaced; accordingly, the energy of a light photon is insufficient to release the trapped electron.

Hence, in a photo-sensitive medium according to the invention a layer of small crystals of an appropriate material, such as an alkali halide, is substantially saturated with color centers by irradiation of X-rays, gamma rays or high energy electrons, thus rendering the layer of crystals sensitive to light. That is, the color centers are readily bleached by impingement of light photons of appropriate wavelength within the visible range of wavelengths.

Furthermore, the photo-sensitive layer of crystals can be rendered non-sensitive, that is, an image reported on the layer can be "fixed" by application of an electric field causing the color centers to migrate within respective crystals so that they are no longer unstable or bleachable.

Accordingly, a photo-sensitive medium of considerable speed is provided which requires no chemical development but only the application of an appropriate electric field to stabilize a recorded photographic image.

The theoretical explanation of the operation of the photographic process according to the present invention is believed correct but it should be noted that the utility and operativeness of the process and apparatus is not predicated upon the accuracy of the theory presented but is rather based upon actual performance and results of the process and apparatus to be described hereafter. Likewise the theory presented is not intended as a limitation of the scope of the invention.

The complete process of preparation and utilization of photosensitive material according to the present invention using an alkali halide as a recording medium for the formation of color centers in the development of a photographic process is represented pictorially in FIG. 5(A) through FIG. 5(D).

According to this invention a carrier or base supporting the recording medium comprising crystals of an alkali halide is sensitized by irradiation with X-rays or Beta rays. FIG. 5(A) shows the formation of color centers 12 in a single crystal 13 of an alkali halide deposited on a paper base comprising an electrically conductive base such as a metal. Metal foil paper laminate is a suitable carrier or base material for the recording medium. Aluminum foil or other metal foil alone may be used. Metal conductors such as aluminum, nickel, copper, etc., are suitable as a conductive material on the carrier.

After the recording medium has been sensitized by X-rays or electron bombardment the "film" must be kept in the dark otherwise bleaching will occur.

In FIG. 5(B) there is shown an exposure of a portion of the crystal of an alkali halide with bleaching occurring in the areas 14 and 15 upon which photons impinge. At this stage the positive image formed is highly unstable. This makes it necessary to prevent the exposure of the color centers, which have not been bleached by light.

To stabilize the image formed on the recording medium an electrical field is applied which causes migration of the color centers in the crystal toward the cathode 16 and away from the anode 17, as shown in FIG. 5(C). When the recording medium is used for the reproduction of images, exposure to the light and the electric field may take place simultaneously or the electric field may be applied subsequent to exposure to the light image.

As a result of the application of an electrical field to the recording medium the positive image becomes stable as shown in FIG. 5(D) and will not be bleached by exposure to light. Hence, the film may be exposed to the light once the positive image has been rendered stable.

Referring now to FIG. 6 there is shown a photosensitive recording medium 18 according to the invention supported on a suitable conductive carrier 19.

The purpose of a conductive backing for the photosensitive medium is to facilitate the exposure of the crystal layer to an electric field of considerable intensity, for example, 10,000 volts per cm. With a layer of the usual thickness, an electrical potential difference of 10 to 100 volts will produce the desired field if the field is directly through the photosensitive layer.

On the other hand, if a paper backing with a high dielectric constant and considerable thickness were used for the photosensitive medium, then a field applied through the paper and photosensitive layer would be largely wasted in the dielectric paper backing, thus requiring much higher voltages for "fixing" the image.

For the foregoing reasons, it is contemplated that the photosensitive medium will generally comprise a conductive backing of aluminum foil, or the like. FIG. 6 shows a special form of photosensitive paper comprising a layer 18 of photosensitive emulsion, a conductive layer 19 and a dielectric paper base 20 for strength and durability. The conductive layer 18 extends beyond the edge of the photosensiitive layer 18, so that a field may be produced through layer 18 by means of a roller or platen on the surface of layer 18, together with a roller or other electrical contact bearing on the exposed surface of conductive layer 19 between which is applied an electrical potential of 10 to 100 volts. Of course, a simple straightforward way to facilitate the application of an electric field is to utilize a medium without the dielectric backing 20 of FIG. 6. In such case, the field may be applied by rollers bearing respectively on the surface of the photosensitive layer 18 and the back of the conductive layer 19, as will be described with respect to FIG. 7. In such case, the layer 18 would normally cover the entire surface of conductive layer 19.

The recording medium which comprises crystals of an alkali halide, for example potassium bromide, has been sensitized by exposure to X-rays or electron bombardment. The irradiation-sensitive alkali halide crystals are preferably applied as dispersions in small amounts of water insoluble nonconductive film forming binders to a conductive carrier such as aluminum foil. The binder holds the particles to the conductive backing.

The irradiation-sensitive composition is otbained from a mixture of crystals of an alkali halide, a suitable binder and a solvent which are ground in a ball mill for a sufficient length of time until a smooth dispersion is obtained. The size of the crystals at this point should be about one micron. The dispersion is spread over the surface of a conductive base such as a lamina of thin aluminum foil 19 and paper 20 in a uniform layer and at a thickness of about three mils. The solvent can be removed by evaporation at elevated temperatures.

As suitable binders, non-hydrophilic binders are preferred and systems such as polyvinyl alcohol, polyvinyl chloride, gelatin and starch should generally be avoided. Among the preferred binders are "Pliolite" (resinous copolymers of butadiene and styrene, manufactured by Goodyear Chemical), "Zytel" (resin composed of alcohol-soluble polyamides manufactured by Du Pont Chemical Co.), "Versalon" (polyamide resin manufactured by General Mills).

Preferred solvents for preparing the recording composition are toluene, methyl, ethyl ketone, and ethanol. However, other conventional solvents of the class of aromatic and aliphatic ketones and alcohols may be employed within the scope of this invention.

After the recording composition has been prepared with a desired binder as outlined above, it may be coated on a foil, or other, preferably conductive, material. Any suitable coating process may be utilized. For example, a conventional knife coating machine may be used to coat the layer of the material onto a base. The coating can also be performed with other usual methods such as wiring rod, kiss-coating, air knife, etc. Laboratory samples may conveniently be coated with the wiring rod.

Specific illustrative but non-limiting examples of the recording composition and coating processes which will be found useful in the process for production of light-sensitive recording paper will now be given.

EXAMPLE 1

A mixture of 40 parts by weight of potassium bromide is finely divided by ball milling in toluene for a period of about four hours. Then 8 parts by weight of "Pliolite F-7" (a 30 to 70 mol ratio copolymer of butadiene and styrene) is added to the fine dispersion of potassium bromide. The mixture is further agitated in a Waring blender for five minutes. This results in a smooth dispersion. The dispersion is spread over the metal surface of a lamina of thin aluminum foil in a uniform layer and at a thickness of 3 mils. Additional toluene may be added to obtain proper coating consistency. The solvent is evaporated at a moderately elevated temperature and the coating is allowed to dry.

After the coating has been applied to the conductive carrier and allowed to dry the recording medium is exposed to a radiation source, such as gamma-radiation of a radioactive isotope. Exposure to radiation is sufficiently prolonged to obtain good saturation of the carrier surface with radiation induced color centers. After radiation the sensitized surface should be kept in the dark until ready to be used in the proper equipment for exposure.

EXAMPLE 2

A mixture of 50 parts by weight of calcium fluoride is finely divided by ball milling in ethyl alcohol for a period of three hours, then 10 parts by weight of "Zytel" (composed of alcohol soluble polyamides) is added to the dispersion of calcium fluoride. This mixture is further agitated in a Waring blender for ten minutes to obtain a smooth dispersion. The dispersion is spread over the metal surface of a lamina of thin aluminum foil in a uniform layer at a thickness of about 2 mils, and the solvent removed is evaporated at a moderately elevated temperature and the coating is allowed to dry.

After the coating is allowed to dry the recording medium is exposed to beta emission of accelerated electrons provided by a conventional industrial accelerator. Exposure to radiation is sufficiently prolonged to obtain good saturation of the carrier surface with radiation induced color centers. After radiation the sensitized surface should be kept in the dark until ready to be used in the proper equipment for exposure.

EXAMPLE 3

A mixture of 55 parts by weight of silicon oxide ($SiO_2$) is finely divided by ball milling in methyl ethyl ketone for a period of five hours, then 11 parts "Versalon" #1175 (polyamide resin) is added to the dispersion of silicon oxide. This mixture is further agitated in a Waring blender for about five minutes. The dispersion obtained is spread over the metal surface according to the procedure employed in Example 2, and the solvent removed by evaporation at a moderately elevated temperature and the coating is allowed to dry.

After the coating has dried the recording medium is sensitized according to the procedure described in Example 1.

EXAMPLE 4

A sensitized recording medium is prepared according to Example 1, except that cesium fluoride is used in place of potassium bromide.

EXAMPLE 5

A sensitized recording medium is prepared according to Example 2, except that titanium oxide ($TiO_2$) is used instead of silicon oxide.

Equally operative in the above processes are other alkali halides, alkaline earth halides and metallic oxides such as potassium chloride, barium chloride, magnesium oxide, etc. Furthermore, the invention is not limited to the specific combination of binder and solvent employed in the examples and many other combinations are possible within the scope of this invention.

Photocopy apparatus 21 comprises a lens 22 for focusing an image of a document to be copied. The image is focused on a length of paper 23 supplied from a supply reel 24. The paper 23 runs between an image fixing roller 25 and a drive roller 26. FIG. 7 is schematic and simplified, omitting document illumination means, light shields for paper 23, and other conventional elements which may be provided in accordance with knowledge and practice in the art.

The drive roller 26 is driven through pulleys 27 and 28 and belt 29 by an electrical motor 30. Suitable controls 31 are provided to control the paper advance by actuation of motor 30. Rollers 25 and 26 are formed of conductive material which are electrically connected by leads 32 and 33 to a source of electrical potential.

The operation of the apparatus of FIG. 7 with a, preferably foil backed recording medium, is as follows.

An image is projected by lens 22 onto the recording medium 23 for the exposure thereof. Immediately after exposure, the exposed area is transported between rollers 25 and 26 between which is maintained an electric potential for example 50 volts as indicated. A current will flow through the area between the two rollers which will provide the heat desired for the fixing of the image. Alternatively the heat may be supplied by separate conventional means as by electrically heating roller 25. It will be appreciated that the process and operations of FIG. 7 is unusually simple and effective and eliminates many complexities of existing photocopying methods.

It is also possible that the photographic recording medium 18 be arranged so that the light forming image must pass through a semiconductor layer before reaching the photoconductive layer 19.

Another apparatus which may employ the recording composition of the present invention is a camera which is provided with a conventional enclosure, a back and view finder and a conventional lens and shutter assembly. A photographic plate or film is supported on the back of the camera by suitable means.

A source of electrical potential and rollers may be provided as in FIG. 7 through which the sensitive medium is passed before or during removal from the camera.

In addition to the modification of the invention specifically illustrated and described herein other embodiments are possible. For example, the density of the color centers and thereby the coloring and darkness can be increased by mechanical deformations in the crystals. This is due to the fact that the gliding of a crystal along the slip planes causes intense local heating followed by rapid cooling which produces a high density of "frozen" holes. These mechanical deformations are induced by vigorous ball-milling of the crystal powder by the alkali halide followed by heat treatment and quenching.

In place of alkali halide crystals in the recording composition it is possible to use other ionic compounds, especially metallic oxides and alkaline earth halides.

Other variations and embodiments will be apparent to those of skill in the art and it is accordingly desired that the scope of the invention not be limited to those embodiments particularly illustrated or suggested, but that the scope of the invention be defined by reference to the appended claims.

What is claimed is:

1. The process of producing a substantially permanent visible photographic record characteristic of a radiation image comprising the steps of projecting said image on a recording medium having a sensitized surface comprising a crystalline compound selected from the class consisting of alkali halides, alkaline earth halides and metallic oxides, said compound having been sensitized with high energy penetrating radiation selected from the class consisting of X-rays, gamma rays and beta rays to produce bleachable color centers, exposing said recording medium to a radiation source within the visible range of the spectrum and having an absorption band corresponding substantially to the absorption band of said color centers, and impressing an electric field through said sensitized surface causing said color centers to become stable and yield a stable image.

2. The process of producing a substantially permanent visible photographic record characteristic of a radiation image comprising the steps of projecting said image on a recording medium having a sensitized surface comprising an alkali halide, said alkal halide having been sensitized with high energy penetrating radiation selected from the class consisting of X-rays, gamma rays and beta rays to produce bleachable color centers, exposing said recording medium to a radiation source within the visible range of the spectrum and having an absorption band corresponding substantially to absorption band of said color centers, and impressing an electric field through said sensitized surface causing said color centers to become stable and yield a stable image.

3. A process according to claim 2 wherein the alkali halide is potassium bromide.

4. A process for the recording of a light image on an image recording sheet, which comprises exposing to the light image a photo-sensitive surface of said sheet, said sheet including a senitized composition comprising (1) a compound selected from the class consisting of alkali halides, alkaline earth halides and metallic oxides and (2) a binder, said composition having been sensitized with high energy penetrating radiation selected from the class consisting of gamma rays, X-rays and beta rays to produce bleachable color centers, exposing said recording sheet to light photons corresponding substantially to the absorption band of said color centers and impressing an electric field through said sensitized surface to form a stable image.

5. A process according to claim 4 wherein the sensitized composition comprises an alkali halide and an organic water insoluble binder.

6. A process according to claim 4 wherein the sensitized composition comprises a metallic oxide and an organic water-insoluble binder.

7. A process according to claim 5 wherein the alkali halide is potassium bromide.

8. A process according to claim 6 wherein the metallic oxide is silicon oxide.

9. A method for producing a visible stable reproduction of a light image corresponding substantially to the absorption band of the color centers which comprises exposing to said light image an image recording sheet comprising an electrically conductive layer and a sensitized recording coating overlying and bonded to said conductive layer, said sensitized recording coating comprising a compound substantially surface saturated with bleachable color centers by high energy penetrating radiation selected from the class consisting of X-rays, gamma rays and beta rays, said compound selected from the class consisting of alkali halides, alkaline earth halides and metallic oxides in particulate form, and an organic water resistant binder, and applying an electric potential through said sensitized surface thereby rendering the image on the recording sheet stable in the presence of ambient light.

10. An electro-photographic coating comprising a crystalline compound substantially surface saturated with bleachable centers and a binder, the ratio of the crystalline compound to binder being approximately 5 to 1 by weight, said compound having been sensitized by high energy penetrating radiation selected from the class consisting of X-rays, gamma rays and beta rays to produce said color centers and said compound being a member selected from the class consisting of an alkali halide, an alkaline earth halide and a metallic oxide.

11. A coating according to claim 10 wherein the crystalline compound is an alkali halide.

12. A coating according to claim 11 wherein the alkali halide is potassium bromide.

13. A coating according to claim 11 wherein the crystalline compound is potassium bromide and the binder is a copolymer of butadiene and styrene.

14. A photo-sensitive recording sheet comprising a photo-sensitive coating on an electrically conductive carrier therefor, said coating containing (1) crystals of a compound selected from the class consisting of alkali halides, alkaline earth halides and substantially undoped metallic oxides which have been sensitized by exposure to high energy penetrating radiation selected from the class consisting of X-rays, gamma rays and beta rays and (2) an organic binder, said coating containing approximately 5 parts by weight of said radiation sensitized compound per 1 part by weight of said organic binder.

15. A photo-sensitive recording sheet according to claim 14 where the radiation sensitized compound is an alkali metal halide and the organic binder is a copolymer of butadiene and styrene.

16. A process for preparing a photo-sensitive recording sheet which comprises mixing crystals of a compound selected from a class consisting of alkali halides, alkaline earth halides and metallic oxide with a solvent and ball milling the mixture for a period of up to 8 hours and adding to the resulting mixture a binder in such quantity so as to provide a crystalline compound to binder ratio approximately 5 to 1 by weight and continuing mixing the resulting composition until a uniform dispersion is obtained, coating the resulting composition onto a surface of a lamina of thin aluminum foil in a uniform layer having a thickness of about 3 mils, evaporating the solvent from the admixture, and sensitizing the recording composition with high energy penetrating radiation selected from the group consisting of X-rays, gamma rays and beta rays.

References Cited

UNITED STATES PATENTS

| | | | |
|---|---|---|---|
| 3,142,562 | 7/1964 | Blake | 96—1.8 |
| 3,148,276 | 9/1964 | Rothstein | 96—1 X |
| 3,293,037 | 12/1966 | Chopoorian | 96—90 |
| 2,707,162 | 4/1955 | Fries | 96—1.5 X |
| 3,121,006 | 2/1964 | Middleton et al. | 96—1.5 |
| 3,316,088 | 4/1967 | Schaffert | 96—1.5 |
| 3,347,670 | 10/1967 | Nelson et al. | 96—1.5 |

GEORGE F. LESMES, Primary Examiner

C. E. VAN HORN, Assistant Examiner

U.S. Cl. X.R.

96—1, 1.5, 45.2, 88; 117—34; 250—65